US008992316B2

(12) United States Patent
Smith et al.

(10) Patent No.: US 8,992,316 B2
(45) Date of Patent: *Mar. 31, 2015

(54) ALLOWING AN ALTERNATIVE ACTION IN A VIRTUAL WORLD

(75) Inventors: Andrew Bryan Smith, Morrisville, NC (US); Brian Ronald Bokor, Raleigh, NC (US); Peter Frederick Haggar, Raleigh, NC (US); Daniel Edward House, Raleigh, NC (US); William Bruce Nicol, Durham, NC (US)

(73) Assignee: Activision Publishing, Inc., Santa Monica, CA (US)

( * ) Notice: Subject to any disclaimer, the term of this patent is extended or adjusted under 35 U.S.C. 154(b) by 656 days.

This patent is subject to a terminal disclaimer.

(21) Appl. No.: 13/248,864

(22) Filed: Sep. 29, 2011

(65) Prior Publication Data

US 2012/0071218 A1   Mar. 22, 2012

Related U.S. Application Data

(63) Continuation of application No. 11/941,533, filed on Nov. 16, 2007, now Pat. No. 8,062,130.

(51) Int. Cl.
*G06F 17/00* (2006.01)
*A63F 13/30* (2014.01)

(52) U.S. Cl.
CPC ............ *A63F 13/12* (2013.01); *A63F 2300/534* (2013.01); *A63F 2300/5533* (2013.01); *A63F 2300/5553* (2013.01)
USPC .......................................................... 463/31

(58) Field of Classification Search
USPC ............................ 463/30–32; 719/314; 705/1
See application file for complete search history.

(56) References Cited

U.S. PATENT DOCUMENTS

| 6,476,830 | B1 * | 11/2002 | Farmer et al. ................. 715/769 |
| 8,601,386 | B2 * | 12/2013 | Altberg et al. ................ 715/771 |
| 2008/0214253 | A1 * | 9/2008 | Gillo et al. ........................ 463/1 |
| 2008/0235582 | A1 * | 9/2008 | Zalewski et al. .............. 715/716 |

OTHER PUBLICATIONS

World of Warcraft Queue System, May 5, 2006, WOW Gold.
Surette, Tim, Version 1.5 opens a host of new changes as well as two new instanced player-versus-player wars, Jun. 7, 2005, GameSpot.

* cited by examiner

*Primary Examiner* — Ronald Laneau
(74) *Attorney, Agent, or Firm* — Pillsbury Winthrop Shaw Pittman LLP (57) ABSTRACT

A system for allowing an alternative action in a virtual world may include a processor and a module operable on the processor for allowing an alternative action in a virtual world in response to a request for an original action for an avatar of a user being unavailable in the virtual world. A queue stores the request in response to the original action being unavailable. Another module may determine if an alternative action is available for the avatar in response to the original action being unavailable. A further module may present an interface to permit the user to accept the alternative action. The avatar is permitted to perform the alternative action in response to the user accepting the alternative action while the request for the original action is still in the queue.

21 Claims, 3 Drawing Sheets

ALLOWING AN ALTERNATIVE ACTION IN A VIRTUAL WORLD

CROSS-REFERENCE TO RELATED APPLICATIONS

This application is a continuation of U.S. patent application Ser. No. 11/941,533, filed on Nov. 16, 2007, entitled "ALLOWING AN ALTERNATIVE ACTION IN A VIRTUAL WORLD"(which issued as U.S. Pat. No. 8,062,130 on Nov. 22, 2011), which is hereby incorporated by reference herein in its entirety.

BACKGROUND OF THE INVENTION

The present invention relates to simulations, virtual world simulations of the real-world or real-life or a virtual world and the like, and more particularly to a system and method for allowing an alternative action in a virtual world in response to an original requested action being unavailable.

Computer based simulations are becoming more ubiquitous. Simulations may be used for training purposes, for entertainment or for other purposes. Computer simulations such as Second Life™ or similar simulations present a virtual world which allows users or players to be represented by characters known as avatars. Second Life is a trademark of Linden Research, Inc. in the United States, other countries or both. Second Life is an Internet-based virtual world launched in 2003 by Linden Research, Inc. A downloadable client program called the Second Life Viewer enables users, called "Residents", to interact with others in the virtual world through motional avatars. The virtual world basically simulates the real world or environment. The users or residents via their avatar can explore the virtual world, meet other users or residents, socialize, participate in individual and group activities, create and trade items (virtual property) and services from one another.

Occasionally, services and locations in the virtual world can become overloaded due to excess usage and as a result, may not be available at the specific time it is requested. An avatar requesting an overloaded service or location transfer may have to wait for that service or location to become available. In the meantime, due to the fact that a service or location is not available, the avatar may choose to navigate to other locations or pick deferent services. In doing so, the avatar currently has to withdraw his request for the original requested service or location transfer to do this. Accordingly, the avatar's window of opportunity for the original requested service or access to a location can close. Thus, the challenge is to allow an avatar to continue to wait for their original unavailable requested service or location while providing relevant and valuable alternative services until the original service or location becomes available. This will not only provide greater value to the end user, but a mechanism for service providers to better manage server loads so that the services or locations do not become overloaded.

BRIEF SUMMARY OF THE INVENTION

In accordance with an aspect of the present invention, a system for allowing an alternative action in a virtual world may include a processor and a module operable on the processor for allowing an alternative action in a virtual world in response to a request for an original action for an avatar of a user being unavailable in the virtual world. The system may also include a queue for storing the request in response to the original action being unavailable to the avatar of the user. Another module operable on the processor may determine if an alternative action is available for the avatar in response to the original action being unavailable. A further module may present an interface to the user to permit the user to accept the alternative action in response to the alternative action being available. The avatar of the user is permitted to perform the alternative action in response to the user accepting the alternative action while the request for the original action is still in the queue.

In accordance with another aspect of the present invention, a system for allowing an alternative action in a virtual world may include a server hosting a virtual world. A plurality of actions may be provided by the virtual world. Each action may be performable by an avatar of a user in the virtual world in response to a request by the user and the requested action being available. At least one alternative action of the plurality of actions may be presented for selection by the user for the avatar of the user to perform in response to the requested action being unavailable. The request for the requested action is stored in a queue until the requested action becomes available while the avatar of the user performs the alternative action.

In accordance with another aspect of the present invention, a computer program product for allowing an alternative action in a virtual world may include a computer readable storage medium having computer readable program code embodied therewith. The computer readable program code may include computer readable program code configured to permit a user to request an original action for an avatar of the user in the virtual world and computer readable program code configured to receive the request for the original action. The computer readable program code may also include computer readable program code configured to store the request in a queue in response to the original action being unavailable to the user's avatar. The computer readable program code may additionally include computer readable program code configured to determine if an alternative action is available for the user's avatar in response to the original action being unavailable to the user's avatar. The computer readable program code may also include computer readable program code configured to present an interface to the user to permit the user to accept the alternative action in response to the alternative action being available and computer readable program code configured to allow the user's avatar to perform the alternative action in response to the user accepting the alternative action. The computer readable program code may further include computer readable program code configured to permit the user's avatar to perform the alternative action while the request for the original action is still in the queue.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1A:
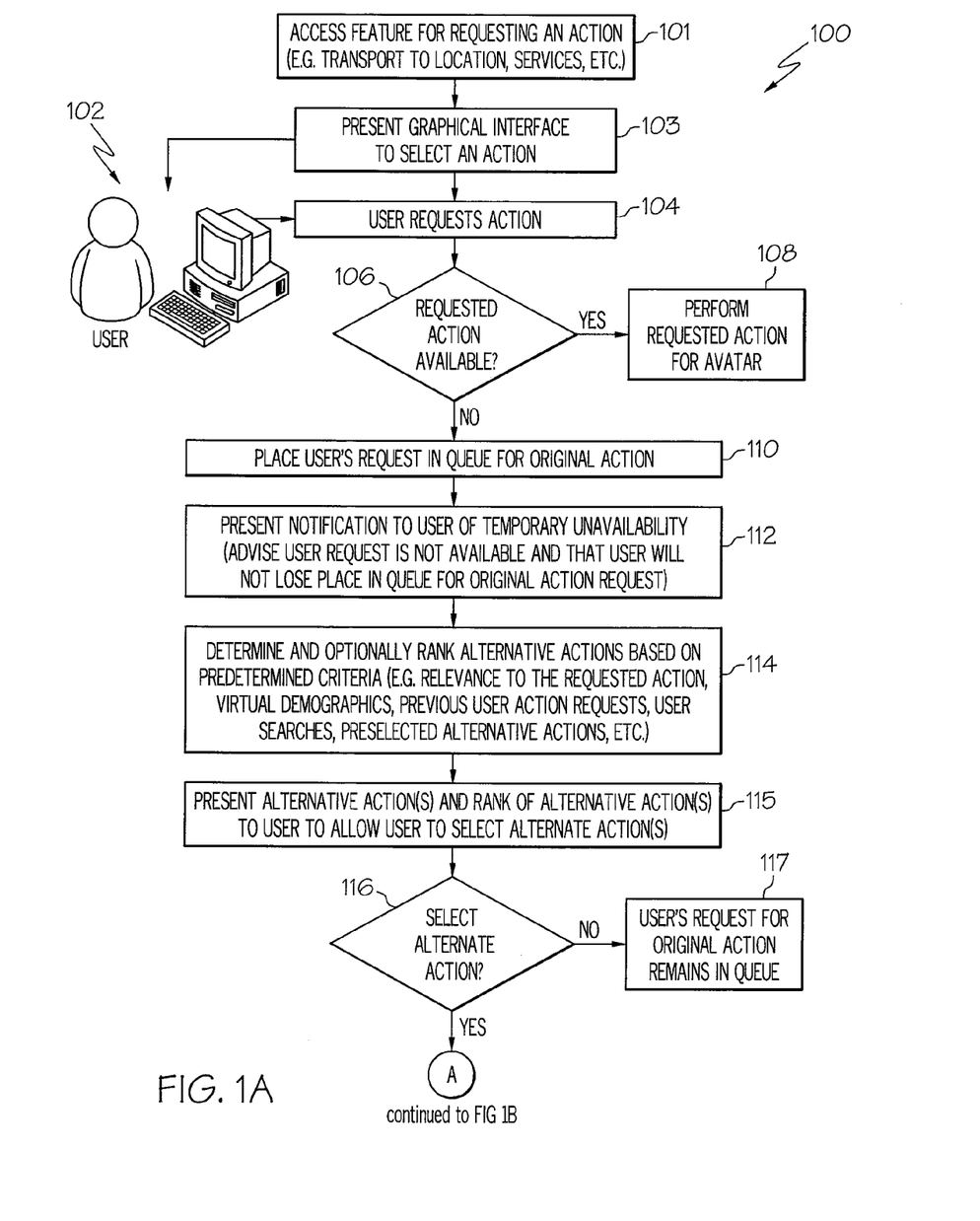
FIGS. 1A and 1B (collectively FIG. 1) are a flow chart of an example of a method for allowing an alternative action in a virtual world in response to a requested action being unavailable in accordance with an embodiment of the present invention.
Figure 1B:
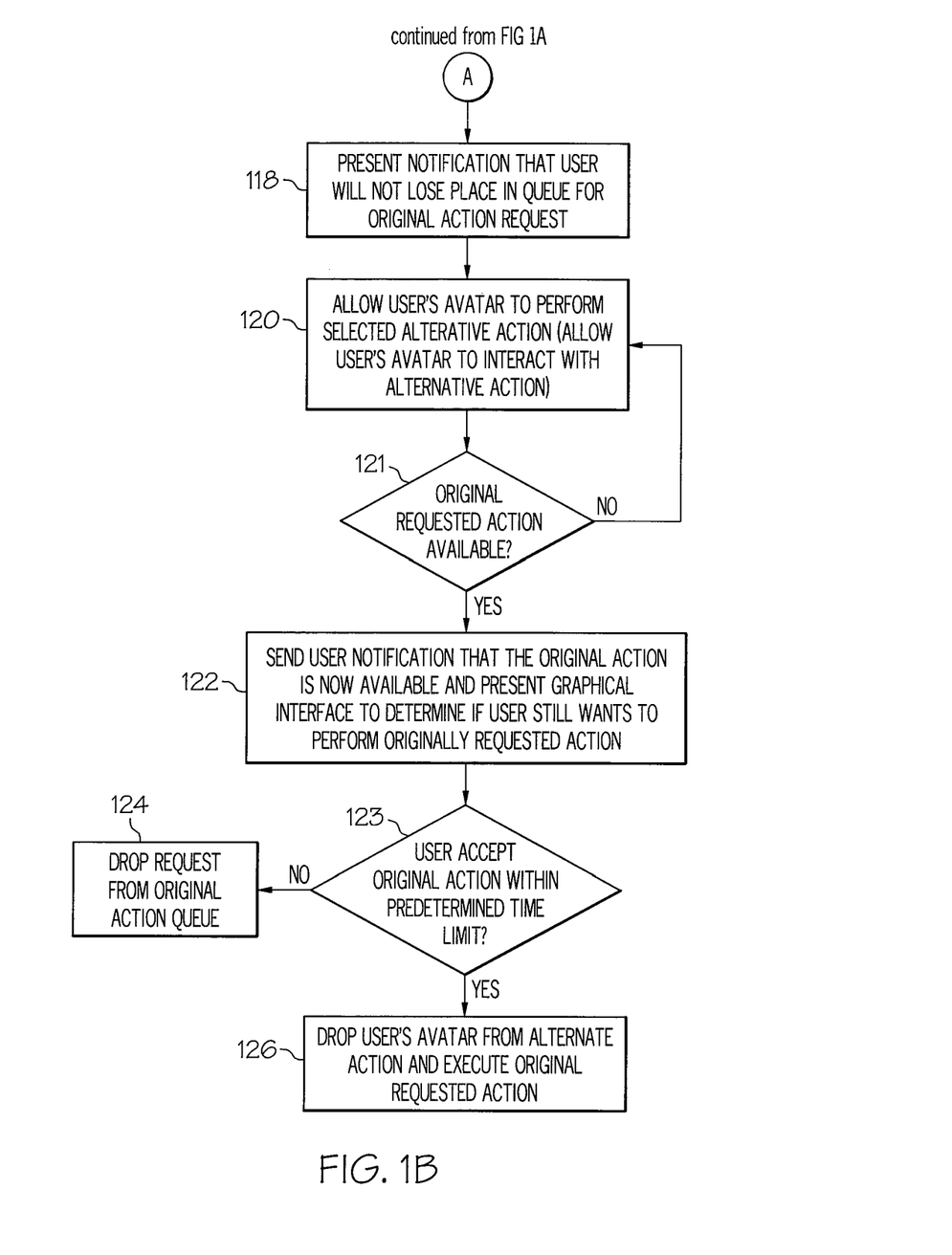

FIGS. 1A and 1B (collectively FIG. 1) are a flow chart of an example of a method 100 for satisfying a request for an action in a virtual world in accordance with an embodiment of the present invention. In block 101, a user 102 may desire that the user's avatar access a feature or an action in the virtual world. An action may include any action in a virtual world that an avatar may perform or which may be performed for an avatar. Examples of an action may include, but are not limited to, transporting the avatar to a specific location (e.g., taking a virtual trip or vacation), performing a service for the avatar (e.g. buying tickets for a concert, attending a concert, buying goods/services from a store, interacting with a concierge desk, interacting with a sales representative, and the like), etc.

In block 103, one or more predetermined GUIs may be presented to a user 102 for the user 102 to select the action for the avatar to perform. The GUI presented to the user 102 may be automatically displayed to the user 102 in response to the avatar triggering some stimulus in the virtual world, or the GUI may be displayed based on some input by the user 102, such as the user 102 pressing certain keys or clicking on an icon.

In block 104, once the GUI is presented to the user 102, the user 102 may then request the action or actions to be performed for the avatar. This may include entering information in the GUI. Alternatively, if no GUI has been presented, an action for the avatar may be requested solely in response to triggering some stimulus in the virtual world and thus a GUI would not be necessary. For example, if an avatar would like to request entry to a retail store in the virtual world, the avatar could open the door and enter the virtual store without a GUI being presented to ask the user if the user would like to request this service.

In block 106, a determination may be made whether the requested action is available. Once the request for an action is entered by the user 102, the request may be sent to a server or some other processing equipment. The server will process the request and determine whether or not the requested action is available, or whether the action is unavailable for some reason, such as the requested action is at full capacity. For example, the server will locate the action that is requested and determine what the capacity of that action is. The capacity of the action may be set by a variable in computer software code associated with the requested action. The server will determine if the capacity is at its maximum threshold limit.

If a determination is made in block 106 that the requested action is available or that the capacity for the selected action is not at its maximum threshold limit, the method 100 may advance to block 108. In block 108, the requested action may be performed for the avatar. The capacity of the action may then be incremented accordingly.

Conversely, if a determination is made in block 106 that the capacity of the action is at its maximum threshold limit or for some other reason is unavailable, the method 100 may advance to block 110 and the user's request may be placed in a queue. When placed in the queue, the user's request is assigned a priority. Each user's request has a priority according to the order in which the request is received. Once the capacity of the requested action is first lower than the maximum threshold limit, the queue is processed to allow the avatar in the queue with the highest priority (i.e. the avatar who had the earliest request) access to the requested action.

In block 112 a notification may be generated to advise the user 102 that the requested action is not available and that the user's request has been placed in the queue. The notification may also advise the user 102 that she will not lose her place in the queue until further notice. The notification may further advise the user 102 that the user's avatar may perform other actions in the virtual world without losing the user's priority in the queue, so long as the user's original request remains in the queue. The notification may be presented visually or any other way, such as a synthesized voice or other type indication, to alert and advise the user 102. The notification may additionally present an option for the user 102 to remove the request from the queue at any time that the user 102 exercises such option. The option may be presented to the user 102 in a GUI and the option to remove the request from the queue may be selected by the user 102 depressing certain keys on a computer keyboard, clicking an icon or other feature in the GUI using a computer pointing device or by other means. The notification may also be presented to the user 102 immediately after the action is deemed to be unavailable for the avatar. Optionally, while the user's request remains in the queue, the notification may be displayed periodically or constantly to the user to remind the user 102 that her request is in the queue. For example, a small window, icon or the like may be presented in the corner of a computer screen, in a tool bar, banner, or elsewhere on the screen or display. Other information may be provided with the notification, such as the user's priority in the queue, an approximate time until the action may become available, other actions that are similar to the requested action or similar information related to the requested action.

The user 102 may also be notified as to what position or priority her request is in the queue, especially when an active avatar is removed from the requested action. This may be accomplished by presenting the user 102 a notification every time an active avatar stops performing or completes the requested action. Alternatively, the user 102 could be constantly updated as to what position or priority in the queue the user 102 has by displaying a priority notification constantly (or periodically) on the screen until the user 102 is removed from the queue.

In block 114, after the user's request is placed in the queue, a server or some other processing equipment may then determine alternative actions for the user. These alternative actions could be any actions in the virtual world. By way of example, the alterative actions could be actions that are related in some way to the originally unavailable action, actions that could be preselected by the provider of the originally unavailable action so as to leverage partnerships, actions that could be preselected by other providers, etc. For example, if an avatar tries to go to a Circuit City® that is full, the user may be presented with a Sony® location because Sony® and Circuit City® have a partnership or because the avatar is looking for a Sony® camera. By way of another example, while an avatar waits in a virtual line for Rolling Stones concert tickets, the user may be offered preselected transports to other virtual recordings of artists under the same label or to band related sites that the band is promoting.

The alternative actions may be determined by any factors, such as avatar demographics, user searches (Internet searches, searches within the virtual world or similar searches), previous user requests for actions, preselected alternative actions, or other factors. Avatar demographics, such as race, age, income, disabilities, mobility (in terms of travel time to work or number of vehicles available), educational attainment, home ownership, hobbies, marital status, employment status, location, and the like, may be used as one or more factors to determine what alternative action will most likely be of interest to that avatar. For example, an avatar that is a 30 year old single male may be interested in dating services or local bars/clubs near his home. Also, previous user requests may also be a factor in determining alternative actions. For example, if a user has frequently requested entering a gym, the user's avatar could be offered access to the gym as an alternative action while the user waits for another action to become available. Another factor for determining an alternative action could be a previous user searches. If a user has repeatedly searched for a particular action, that may be an action that the user may be interested in and thus, may be presented to the user as an alternative action. Additionally, providers of unavailable or overloaded actions may preselect alternative actions for the user in the case that their action become unavailable or overloaded. For example, if a user's avatar desires to go to Wal-mart® but it is unavailable for the user's avatar, Wal-mart® may have preselected alternative locations, such as Sams Club®, a store owned by Wal-mart, to transport the user to.

Another factor that may be used to determine an alternative action may be the relevance to the requested action. If the requested action is unavailable or overloaded, another action that is related to the requested action may be presented as an alternative to fulfill the desire of the user's avatar. For example, if the user desires to go bowling, but the requested bowling alley is full, the user may be presented other bowling alleys or maybe even other recreational facilities, such as a pool hall, any of which is related to the original requested action in some sense. The alternative action only has to be related to the requested action in some manner. The relevance factors may be anything about the action, including the type of the action, the geographical location of the action, the services or products provided by the action, the type of avatars that request the action, the advantages of the action, any of the features of the action, etc. In the above example, the pool hall is related to the bowling alley because both activities are recreational activities or both are indoor games.

If an alternative action is determined to be relevant to the requested action, the alternative action may be ranked according to its relevance to the requested action. The more common factors the alternative action has with respect to the requested action, the higher the ranking of the alternative action will be given. For example, in the previous example, the pool hall will receive a high ranking. The pool hall has several common factors with the bowling alley, such as being a recreational activity, a game that may be played with one or more players, an indoor game, a game that may be played at night, a game that does not involve a whole lot of physical exertion, etc. Thus, since many factors match, this would receive a high ranking, maybe being displayed as a 90% ranking. This ranking may or may not be displayed for the user 102 as it could only be an option.

Additionally, after each alternative action is determined, the alternative actions may be ranked or prioritized with respect to the other alternative actions. The factors to consider in ranking or setting a priority for each alternative action may be based on how relevant each alternative action is to the requested action. For example, in the above example, another bowling alley may rank higher than the pool hall because a bowling alley has many more commonalities to another bowling alley than does a pool hall.

In block 115, a GUI is presented to the user to allow the user 102 to select the alternative action or to select one of a plurality of alternative actions, if more than one is available. This GUI may be presented to the user 102 immediately after the user 102 is notified that the requested action is unavailable. Furthermore, this GUI may not only provide the user 102 with an alternative action or alternative actions that the user 102 may select, but may also include marketing or advertising information or present other relevant information to the user 102.

As shown in block 116, after the GUI is presented to the user 102, the user 102 may make a decision whether or not to select the alternative action or one of the plurality of alternative actions presented in the GUI. If the user 102 does not select any of the alternative actions, then the method 100 may advance to block 117. Optionally, the user 102 may be given a certain predetermined time to accept one of the alternative actions. If the user 102 does not select an alternative action within the predetermined time, the method 100 may advance to block 117.

In block 117, the user's avatar may remain in the queue until the originally requested action becomes available. During this time, the avatar may be allowed to perform other operations in the virtual world. This allows the avatar to continue exploring the virtual world while still waiting for the request for the original action to be processed. This also allows service providers, such as virtual stores, virtual consultants, virtual support, etc., to provide better service with minimal negative impact to the customers.

Alternatively, if the user accepts the alternative action or selects any of the alternative actions, the method 100 may advance to block 118. In block 118, the user 102 is sent a notification stating that the user 102 will not lose her place in the queue for the originally request action. In block 120, the user's avatar is allowed to perform the alternative action while the user's request for the original action is still in the queue.

The present invention is not necessarily limited to the avatar being placed in only one queue if multiple actions that the user requests are unavailable. Many times numerous actions that the user requests may also be unavailable and therefore, the user may be in multiple queues while still exploring the virtual world.

In block 121, a determination may be made if the originally requested action becomes available for the avatar. Continual checks may be performed to determine if the requested action's capacity is below the maximum threshold value or for some other reason the requested action has become available, such as a maintenance or repair issue has been resolved. If the originally requested action is still unavailable in decision block 121, then the method 100 may return to block 120. The method 100 may loop from block 120 to block 121 until the original requested action becomes available or the user 102 removes her request from the queue. The method 100 may advance to block 122 in response to the original requested action becoming available in block 121.

When the capacity drops below the maximum threshold limit for the requested action or the requested action otherwise becomes available, the requested action becomes available for the avatar in the queue having the highest priority, as described above with reference to block 110. In block 122, a notification that the requested action has become available may be sent to the user 102 associated with the avatar. Such notification may inform the user 102 that the originally requested action is now available for the avatar and that a spot in the requested action is being held for the avatar for a predetermined time period (e.g. one minute, five minutes, etc.). The user 102 will then have the predetermined time period to accept the requested action.

In block 123, a determination may be made whether the user 102 has accepted the original action within the predetermined time limit or period. If the user 102 has not accepted the originally requested action within the predetermined time period, the method 100 may advance to block 124. In block 124, the user's originally requested action for the avatar will be dropped from the queue. The user's avatar may continue to perform the alternative action chosen by the user 102. Alternatively, the user 102 may not accept the originally requested action by either rejecting the offer to accept the requested action or by simply not responding within the predetermined time.

If the user accepts the originally requested action in block 123, the method 100 may advance to block 126. In block 126, the user's avatar is allowed to perform the requested action and the user's request for the requested action is then dropped from the queue. Additionally, the user's avatar may stop performing any other actions, including any alternative actions, in the virtual world chosen by the user while in the queue so that the avatar can perform the originally requested action. However, if the avatar is performing another action, including any alternative action, while waiting for the requested action to become available, the user 102 may desire to continue the other action before accepting the requested action. Thus, when the requested action becomes available and the avatar is performing another action, a GUI may be presented to the user 102 for accepting the originally requested action that may include an option to delay acceptance of the requested action or commencement of the requested action for a chosen time period or until the user 102 is finished performing the other action. Accordingly, when the avatar is finished performing the other action, including any alternative action, the user 102 may then reactivate the acceptance GUI and accept the originally requested action. Accepting the originally requested action would then drop the request from the queue and allow the user's avatar to perform the originally requested action. In accordance with an aspect of the present invention, if the user's avatar does not finish the other actions within the chosen time period, the user's originally requested action may be dropped from the queue and the user's avatar would simply continue performing the other action.

In accordance with another aspect of the invention, the GUI presented to the user 102 for accepting the originally requested action may also include an option for the user 102 to reset the user's request to a lower priority in the queue. The user's request may be remove from the queue and then reinserted in the queue at a lower priority. When the user's request for the original action becomes available, the method 100 may then return to block 123.

Figure 2:
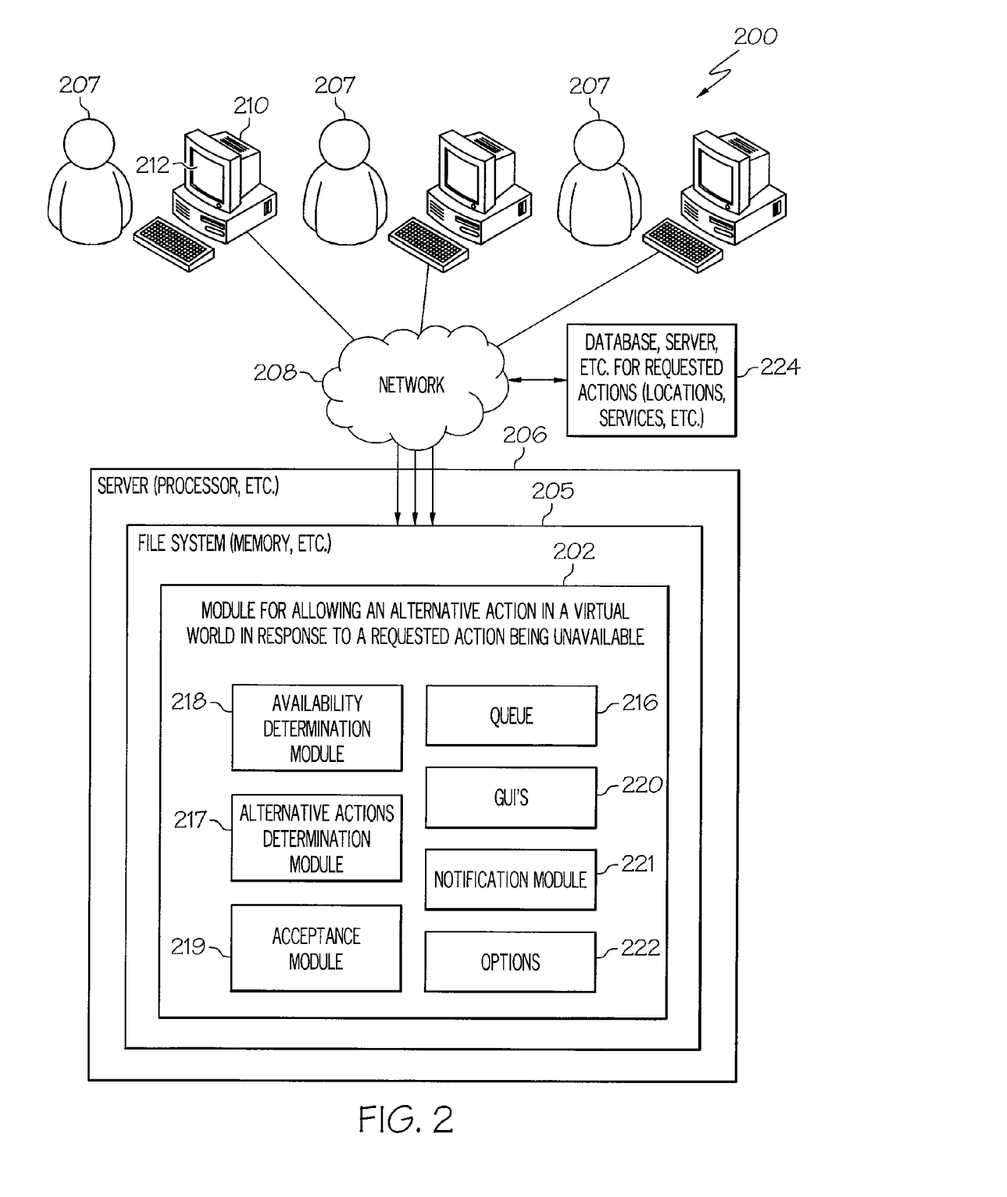
FIG. 2 is a block schematic diagram of an example of a system for allowing an alternative action in a virtual world in response to a requested action being unavailable in accordance with an embodiment of the present invention.

FIG. 2 is a block schematic diagram of an example of a system 200 for allowing an alternative action in a virtual world in response to a requested action being unavailable in accordance with an embodiment of the present invention. The system 200 may include a module 202 for allowing an alternative action in a virtual world in response to a requested action being unavailable (hereinafter "alternative action module 202"). The method 100 may be embodied in or performed by the alternative action module 202.

The alternative action module 202 may be part of a virtual world simulation system or program, such as Second Life™ or similar virtual world system. The alternative action module 202 may also be a self contained system with embedded logic, decision making, state based operations and other functions that may operate in conjunction with a virtual world simulation, such as Second Life™. The self contained system may allow businesses, individuals, services, locations, and the like in the virtual world to interact with the avatar while the avatar is waiting for another action to become available.

The alternative action module 202 may be stored on a file system 205 or memory of a server 206 or other suitable data processing equipment. The alternative action module 202 may be accessed by a plurality of users 207, similar to user 102 in FIG. 1, or participants via a network 208 using an Internet browser on a personal computer 210 or by similar means. The network 208 may be the Internet, a private network or other network.

The alternative action module 202 may present one or more predetermined graphical user interfaces 220, similar to the GUIs described with respect to the method 100, to permit satisfying a request for an action, such as a virtual location, goods, services or other actions, for a user's avatar in a virtual world or simulation.

The GUIs 220 may include a GUI to present one or more alternative actions for a user's avatar in response to an original requested action being unavailable, similar to that previously described. The user may continue to perform a selected alternative action in the virtual world while waiting for an originally requested action to become available. The predetermined GUIs 220 may be generated by the alternative action module 202 as described herein and may be presented on a display 212 of the personal computer 210 to the user 207.

The alternative action module 202 may also include a queue 216. The queue 216 is where the request for an action may be stored when an availability determination module 218 determines that a request for a particular action has exceeded capacity (maximum threshold limit) or is not available for some reason. Each request may be assigned a priority based on when the request was received and also each request is associated with the action requested. The earlier the request is received, the higher the priority that is assigned to the request. When a requested action has less than the maximum capacity or is available and there are requests in the queue 216 for the action, the highest priority request for the action will be removed from the queue 216 and the avatar associated with that request will be given access to the action.

The alternative action module 202 may also include an acceptance module 219. Portions of the method 100 in FIGS. 1A and 1B may be embodied in the acceptance module 219. The acceptance module 219 may present GUIs to the user 207 to inform the user 207 of the requested action's availability and to permit the user 207 to accept or rejected the requested action. Internet communications technologies or applications, such as Local Chat, Instant Messaging, e-mail, or similar communications means, may be used to permit informing the user 207 of availability and acceptance or non-acceptance of the request by the user 207.

The alternative action module 202 may also include an alternative actions determination module 217. The alternative actions determination module 217 determines what alternative actions may be available for presentation to the user 207. The alternative actions determination module 217 may select and retrieve any of the alternative actions from a database 224. Additionally, any of the alternative actions may be preselected, stored in the database 224 and then retrieved by the alternative actions determination module 217.

In determining the alternative actions, the alternative actions determination module 217 may take into account the unavailable requested action and information relative to the avatar similar to that previously described with respect to block 114 in FIG. 1. The alternative actions may be ranked based on certain criteria and presented to the user 207 in a ranked fashion. For example, the alternative actions may be ranked based on a relevance to the unavailable requested action. This may provide the user 207 with the closest alternative options to the requested action. Also, in determining the alternative actions, the avatar's profile may be taken into account or any other information related to the avatar. For example, the alternative actions determination module 217 may take into account the avatar's demographics or the avatar's previous requested actions to determine what alternative actions the avatar may be interested in. This caters the alternative actions to each individual avatar.

The alternative action module 202 may further include an options feature 222. The options feature 222 may include any future enhancements, configurations, and extensions to the existing system or any additions relating to the alternative action module 202. As an example, a notification system 221 could be added to the alternative action module 202 which could be configured as an option to email updates or provide notification by some other mechanism.

The system 200 may also include a database 224, server, or other mechanism to store actions and to present any requested actions in response to being requested by any of the users 207 for the respective user's avatar. As previously discussed, the actions may include, but are not necessarily limited to different locations that may be visited by avatars corresponding to the users 207 or participants, different services that may be provided to a user's avatar or other actions. Additionally, preselected alternative actions, information about avatars, previous request actions by avatars, or any other virtual information may be stored in the database 224.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for allowing an alternative action in a virtual world, comprising:
   one or more physical processors programmed with one or more computer program instructions which, when executed, cause the one or more physical processors to:
   receive a request to allow an avatar of a user to perform an action in a virtual world;
   determine whether the action is available to the avatar in response to the request;
   store the request in a waiting list in response to a determination that the action is not available to the avatar;
   determine an alternative action available to the avatar in response to the determination that the action is not available to the avatar; and
   allow the avatar to perform the alternative action in the virtual world while the request remains in the waiting list.

2. The system of claim 1, wherein the one or more physical processors are further caused to:
   determine whether the action has become available to the avatar of the user;
   enable the user to accept the action in response to a determination that the action has become available to the avatar; and
   allow the avatar to perform the action in the virtual world in response to the user accepting the action.

3. The system of claim 2, wherein the avatar of the user is allowed to continue to perform the alternative action in response to the user not accepting the action after the action became available to the avatar.

4. The system of claim 2, wherein the one or more physical processors are further caused to:
   provide a predetermined time period for the user to accept the action in response to the action becoming available to the avatar,
   wherein the request is dropped from the waiting list in response to the user not accepting the action within the predetermined time period.

5. The system of claim 1, wherein the one or more physical processors are further caused to:
   provide a predetermined time period for the user to accept the alternative action in response to the determination that the action is not available to the avatar and the determination that the alternative action is available to the avatar,
   wherein the avatar is allowed to perform the alternative action in the virtual world in response to the user accepting the alternative action within the predetermined time period.

6. The system of claim 1, wherein the action comprises at least one of transporting the avatar of the user to a selected location in the virtual world or the avatar receiving a chosen service.

7. The system of claim 6, wherein the alternative action comprises at least one of transporting the avatar of the user to another selected location in the virtual world or the avatar receiving another chosen service.

8. The system of claim 2, wherein the one or more physical processors are further caused to:
   in response to the determination that the action has become available to the avatar, provide an option to the user to select one of: (i) accepting the action without waiting for the alternative action to be finished; and (ii) delaying acceptance of the action for a predetermined time period to allow the alternative action to finish.

9. The system of claim 1, wherein the one or more physical processors are further caused to:
   determine one or more other alternative actions available to the avatar in response to the determination that the action is not available to the avatar; and
   select, from among the alternative action and the one or more alternative actions, the alternative action for presentation to the user based on at least one of virtual demographics associated with the avatar, previously requested actions of the user, previous searches of the user, or relatedness of the alternative action to the action,
   wherein the presentation of the alternative action enables the user to accept the alternative action, and wherein the avatar is allowed to perform the alternative action in the virtual world in response to the user accepting the alternative action.

10. The system of claim 1, wherein determining whether the action is available to the avatar comprises determining whether a threshold associated with the action has been reached in response to the request,
    wherein storing the request in the waiting list comprises storing the request in the waiting list in response to a determination that the threshold has been reached, and
    wherein determining the alternative action comprises determining the alternative action in response to the determination that the threshold has been reached.

11. The system of claim 1, wherein the alternative action is preselected as a potential alternative action for the action by a third-party entity.

12. A method of allowing an alternative action in a virtual world, the method being implemented on a computer system that includes one or more physical processors executing one or more computer program instructions which, when executed, perform the method, the method comprising:
    receiving, at the computer system, a request to allow an avatar of a user to perform an action in a virtual world;

determining, by the computer system, whether the action is available to the avatar in response to the request;

storing, by the computer system, the request in a waiting list in response to a determination that the action is not available to the avatar;

determining, by the computer system, an alternative action available to the avatar in response to the determination that the action is not available to the avatar; and allowing, by the computer system, the avatar to perform the alternative action in the virtual world while the request remains in the waiting list.

13. The method of claim 12, further comprising:

determining, by the computer system, whether the action has become available to the avatar of the user;

enabling, by the computer system, the user to accept the action in response to a determination that the action has become available to the avatar; and allowing, by the computer system, the avatar to perform the action in the virtual world in response to the user accepting the action.

14. The method of claim 13, wherein the avatar of the user is allowed to continue to perform the alternative action in response to the user not accepting the action after the action became available to the avatar.

15. The method of claim 13, further comprising:

providing, by the computer system, a predetermined time period for the user to accept the action in response to the action becoming available to the avatar, wherein the request is dropped from the waiting list in response to the user not accepting the action within the predetermined time period.

16. The method of claim 12, further comprising:

providing, by the computer system, a predetermined time period for the user to accept the alternative action in response to the determination that the action is not available to the avatar and the determination that the alternative action is available to the avatar, wherein the avatar is allowed to perform the alternative action in the virtual world in response to the user accepting the alternative action within the predetermined time period.

17. The method of claim 12, further comprising:

determining, by the computer system, one or more other alternative actions available to the avatar in response to the determination that the action is not available to the avatar; and selecting, by the computer system, from among the alternative action and the one or more alternative actions, the alternative action for presentation to the user based on at least one of virtual demographics associated with the avatar, previously requested actions of the user, previous searches of the user, or relatedness of the alternative action to the action, wherein the presentation of the alternative action enables the user to accept the alternative action, and wherein the avatar is allowed to perform the alternative action in the virtual world in response to the user accepting the alternative action.

18. The method of claim 12, further comprising:

in response to the determination that the action has become available to the avatar, provide, by the computer system, an option to the user to select one of: (i) accepting the action without waiting for the alternative action to be finished; and (ii) delaying acceptance of the action for a predetermined time period to allow the alternative action to finish.

19. A computer program product for allowing an alternative action in a virtual world, the computer program product comprising:

a non-transitory computer readable storage medium having computer readable program code embodied therewith, the computer readable program code embodied therewith comprising:

computer readable program code configured to receive a request to allow an avatar of a user to perform an action in a virtual world;

computer readable program code configured to determine whether the action is available to the avatar in response to the request;

computer readable program code configured to store the request in a waiting list in response to a determination that the action is not available to the avatar;

computer readable program code configured to determine an alternative action available to the avatar in response to the determination that the action is not available to the avatar; and computer readable program code configured to allow the avatar to perform the alternative action in the virtual world while the request remains in the waiting list.

20. The computer program product of claim 19, wherein the computer readable program code embodied therewith further comprises:

computer readable program code configured to determine whether the action has become available to the avatar of the user;

computer readable program code configured to enable the user to accept the action in response to a determination that the action has become available to the avatar; and computer readable program code configured to allow the avatar to perform the action in the virtual world in response to the user accepting the action.

21. The computer program product of claim 20, wherein the computer readable program code embodied therewith further comprises:

computer readable program code configured to allow the avatar of the user to continue to perform the alternative action in response to the user not accepting the action after the action became available to the avatar.

* * * * *